(12) United States Patent
Zhang et al.

(10) Patent No.: US 11,836,976 B2
(45) Date of Patent: Dec. 5, 2023

(54) METHOD FOR RECOGNIZING SEAWATER POLLUTED AREA BASED ON HIGH-RESOLUTION REMOTE SENSING IMAGE AND DEVICE

(71) Applicant: BEIJING UNIVERSITY OF CIVIL ENGINEERING AND ARCHITECTURE, Beijing (CN)

(72) Inventors: Xueling Zhang, Beijing (CN); Lu Li, Beijing (CN)

(73) Assignee: BEIJING UNIVERSITY OF CIVIL ENGINEERING AND ARCHITECTURE, Beijing (CN)

( * ) Notice: Subject to any disclaimer, the term of this patent is extended or adjusted under 35 U.S.C. 154(b) by 0 days.

(21) Appl. No.: 17/771,602

(22) PCT Filed: Aug. 5, 2020

(86) PCT No.: PCT/CN2020/106921
§ 371 (c)(1),
(2) Date: Apr. 25, 2022

(87) PCT Pub. No.: WO2021/077847
PCT Pub. Date: Apr. 29, 2021

(65) Prior Publication Data
US 2022/0383633 A1     Dec. 1, 2022

(30) Foreign Application Priority Data

Oct. 23, 2019   (CN) .......................... 201911009104.8

(51) Int. Cl.
*G06K 9/00*       (2022.01)
*G06V 20/10*      (2022.01)
(Continued)

(52) U.S. Cl.
CPC .......... *G06V 20/188* (2022.01); *G06T 7/0002* (2013.01); *G06T 7/11* (2017.01);
(Continued)

(58) Field of Classification Search
CPC ...... G06F 16/29; G06F 16/51; G06F 18/2431; G06F 16/5838; G06F 16/5846;
(Continued)

(56) References Cited

U.S. PATENT DOCUMENTS

2014/0119656 A1*   5/2014   Lilje .......................... G06T 7/12
                                                              382/173

FOREIGN PATENT DOCUMENTS

CN           105630882 A       6/2016
CN           108256534 A       7/2018
(Continued)

OTHER PUBLICATIONS

Yu, An improved Otsu method for oil spill detection from SAR images, Science Direct, Oceanologia, vol. 59, Issue 3, 2017 (Year: 2017).*

(Continued)

*Primary Examiner* — Alex Kok S Liew
(74) *Attorney, Agent, or Firm* — Maschoff Brennan

(57) ABSTRACT

A method for recognizing polluted seawater areas based on high-resolution remote sensing images includes performing automatic sea and land classification on a remote sensing image by using a supervised learning algorithm. The classification result reaches a higher precision level by processsized iterative clustering compared to conventional methods. The method further includes combining a chlorophyll-associated normalized difference vegetation index, a brightness-associated normalized difference water shadow index, a segmentation-based image interpretation thought and a human visual saliency-based mechanism in remote sensing
(Continued)

interpretation by virtue of a chlorophyll concentration difference of a seawater polluted area and surrounding seawater and a brightness difference of pollutant shadows. The seawater polluted area is extracted by threshold segmentation. An area where the water quality is good and a heavily polluted area are extracted. A pollution transition area is further extracted. The method provides convenience and an accurate reference for prevention and control of marine pollution.

16 Claims, 7 Drawing Sheets

(51) Int. Cl.
| | |
|---|---|
| *G06T 7/12* | (2017.01) |
| *G06T 7/11* | (2017.01) |
| *G06T 7/90* | (2017.01) |
| *G06T 7/70* | (2017.01) |
| *G06V 20/70* | (2022.01) |
| *G06V 10/762* | (2022.01) |
| *G06V 10/32* | (2022.01) |
| *G06V 10/764* | (2022.01) |
| *G06T 7/00* | (2017.01) |

(52) U.S. Cl.
CPC ............... *G06T 7/12* (2017.01); *G06T 7/70* (2017.01); *G06T 7/90* (2017.01); *G06V 10/32* (2022.01); *G06V 10/762* (2022.01); *G06V 10/764* (2022.01); *G06V 20/70* (2022.01); G06T 2207/10024 (2013.01); G06T 2207/10032 (2013.01); G06T 2207/10048 (2013.01); G06T 2207/20021 (2013.01); G06T 2207/20081 (2013.01); G06T 2207/30188 (2013.01)

(58) Field of Classification Search
CPC ............... G06F 16/5866; G06F 16/587; G06F 16/2291; G06F 17/14; G06F 18/22; G06F 11/0706; G06F 11/0739; G06F 11/0778; G06F 11/3604; G06F 11/3664; G06F 16/248; G06F 16/738; G06F 16/9535; G06T 17/05; G06T 2207/30181; G06T 7/11; G06T 7/12; G06T 2207/10032; G06T 2207/10036; G06T 11/00; G06T 11/20; G06T 2207/30188; G06T 2207/20021; G06T 2207/20084; G06T 7/136; G06T 2207/10044; G06T 7/13; G06T 7/181; G06T 15/005

See application file for complete search history.

(56) References Cited

FOREIGN PATENT DOCUMENTS

| | | |
|---|---|---|
| CN | 108986116 A | 12/2018 |
| CN | 110765941 A | 2/2020 |

OTHER PUBLICATIONS

Cheng, Efficient sea-land segmentation using seeds learning and edge directed graph cut, Elsevier Neurocomputing, vol. 207, 2016 (Year: 2016).*

Jishuang, "A Multi-Threshold Based Morphological Approach for Extracting Coastal Line Feature in Remote Sensed Images." (2002) (Year: 2002).*

Sağlam, A new color distance measure formulated from the cooperation of the Euclidean and the vector angular differences for lidar point cloud segmentation, International Journal of Engineering and Geosciences 6 (2021) (Year: 2021).*

Zhang et al. "Marine Environment Distinctions and Change Law Based on eCongnition Remote Sensing Technology" Mar. 2019.

* cited by examiner

METHOD FOR RECOGNIZING SEAWATER POLLUTED AREA BASED ON HIGH-RESOLUTION REMOTE SENSING IMAGE AND DEVICE

TECHNICAL FIELD

The present invention belongs to the technical field of digital image processing, in particular to a method for recognizing a seawater polluted area based on a high-resolution remote sensing image and a device.

BACKGROUND ART

Nowadays, with the increasing demand of global land resources and continuous environment deterioration, various countries in the world focus on ocean in succession, and the development of marine resources and marine economy has become an important support of national economy of coastal countries and has also occupied a forward position of the strategy for sustainable development. Modern ocean development also brings a series of problems about resources and ecological environment while bringing huge economic benefits. At present, the marine environment pollution becomes increasingly serious, and the ecological environment is also increasingly deteriorated. Marine economic industries such as marine fishery and marine breeding industry are strongly dependent on the marine environment. To develop the marine resources, good marine working environment guarantee capability and accurate marine environment data have to be provided. A marine environment monitoring technology is exactly a microscope and a telescope for protecting the marine resources and avoiding marine and ecological environment deterioration, is a pilot work for discovering marine pollution and restoring ecological balance and is an important means for guaranteeing marine sustainable development. It is reported that the annual loss in China reaches nearly 80000 million yuan due to offshore pollution, wherein a major part of the loss is occupied by the marine economic industries such as the marine fishery and the marine breeding industry. If the macroscopic large-scale marine pollution is monitored, not only can the loss caused by the marine pollution be avoided, but also the development tendency can be predicted, so that related countermeasures are adopted.

Land-based pollution is the biggest pollution source causing the marine environment pollution, in addition, organic substances, nutritive salts and a great number of radioactive substances are increasingly entering the ocean, and marine pollution caused by industrial thermal pollution and other solid substances is also increased. The marine pollution in China is mainly caused by pollutant discharge from a land source, and 80% of sewage and various toxic substances discharged into the Chinese seawater come from the land. Problems that we have to face and solve are to protect the marine ecological environment from being further deteriorated while keeping the rapid development of marine economy, change the environment quality in certain sea areas to a certain extent, enhance the research on the formation mechanism and interaction of marine disaster factors, and improve the forecasting technology and level to prevent and relieve marine disasters so as to relieve the conflict between marine economic development and the environment.

Traditional various harmful substances are monitored by using a method of in-situ sampling and chemical analysis in a laboratory, and such a method has certain advantages for coastal marine environment pollution detection within a narrow range, but is time-consuming, strenuous and greatly restricted by the environment, climate and cost during wide-range macroscopic offshore and open-sea marine environment pollution monitoring. With the rapid development of a remote sensing technology and the liftoff of a great number of high-precision remote sensing satellites, the acquisition of high-resolution multi-band cheap remote sensing data becomes true. The remote sensing data is used to bring convenience for people to better perform comprehensive automatic, long-term and continuous monitoring analysis on marine pollution and may help people to monitor and quantitatively analyze a polluted area. For example, in "an offshore pollutant recognizing and tracking method based on remote sensing data deep learning" (with the publication No. CN 105630882 A), the variation of a pollution condition of the Bohai Bay nearby Tianjin is analyzed by using an American satellite remote sensing image by virtue of an improved Grab-Cut image segmentation algorithm. However, these methods are restricted by large calculated quantity of a convolutional layer of a deep learning convolutional neural network model, high demands on a calculation device, huge fund investment, the guidance from professionals and the like; and the Grab-Cut image segmentation algorithm lays particular stress on solving the problem such as precision of segmentation dimension of an original remote sensing image algorithm, is lack of association between "segmentation-classification" links and is short of discussion on classification and recognition of specific pollutants.

SUMMARY OF THE INVENTION

Objectives of the present invention: for the above-mentioned problems, the present invention provides a method for recognizing a seawater polluted area based on a high-resolution remote sensing image and a device, by which efficient and precise detection and recognition for a seawater polluted area can be achieved at low calculation cost.

Technical solutions: according to a first aspect of the present invention, provided is a method for recognizing a seawater polluted area based on a high-resolution remote sensing image. The method includes a step of water and land differentiation and a step of hierarchical recognition for a seawater polluted area, wherein the step of water and land differentiation includes:
segmenting an original remote sensing image into several superpixels by using a linear iterative clustering method;
calculating a normalized difference water index $K_x(mndwi)$ of each superpixel; and dividing the image into a seawater area and a land area based on a first threshold T1 according to $K_x(mndwi)$;

the step of hierarchical recognition for the seawater polluted area includes:
segmenting the seawater area into several child superpixels with reference to a superpixel segmentation method;
calculating a normalized difference vegetation index $K_x(ndvi)$ of each child superpixel;
dividing the seawater area into an area where the water quality is good and an area where the water quality is not good based on a second threshold T2 according to $K_x(ndvi)$;
calculating a normalized difference water shadow index $K_x(ndwsi)$ of each child superpixel;

dividing the seawater area into an area where the water quality is good and an area where the water quality is not good based on a third threshold T3 according to $K_x$(ndwsi); and extracting a seawater pollution diffusion area in combination with the area, extracted according to the second threshold T2, where the water quality of seawater is good and the area, extracted according to the third threshold T3, where the water quality of seawater is not good.

According to a second aspect of the present invention, provided is a computer device. The device includes:

one or more processors;

a memory;

and one or more programs, wherein the one or more programs are stored in the memory and are configured to be executed by the one or more processors, and the steps in the first aspect of the present invention are implemented when the programs are executed by the processors.

Beneficial Effects

1. The traditional investigation on marine pollution monitoring is mainly dependent on ships for artificial sampling and sample analysis in a laboratory. In the present invention, marine environment pollution detection is achieved by using a high-resolution remote sensing image and is based on experimental data and algorithm guidance, so that the efficiency, time effectiveness and range of marine pollution detection are greatly increased.

2. A classification result may reach a higher precision level by processized iterative clustering, and meanwhile, compared with an existing analysis and classification method for a sea and land boundary, the algorithm is less in calculation.

3. In the present invention, a chlorophyll-associated normalized difference vegetation index, a brightness-associated normalized difference water shadow index, a segmentation-based image interpretation thought and a human visual saliency based mechanism in remote sensing interpretation are combined for the first time by virtue of a chlorophyll concentration difference of a seawater polluted area and surrounding seawater and a brightness difference of pollutant shadows, and the seawater polluted area is extracted by threshold segmentation, wherein an area where the water quality is good and a heavily polluted area are respectively extracted, and then, a pollution transition area is further extracted. The method is ingenious and simple and provides convenience and an accurate reference for prevention and control of marine pollution.

DETAILED DESCRIPTION OF THE INVENTION

The technical solutions of the present invention will be further described below in combination with the drawings.

Figure 1:
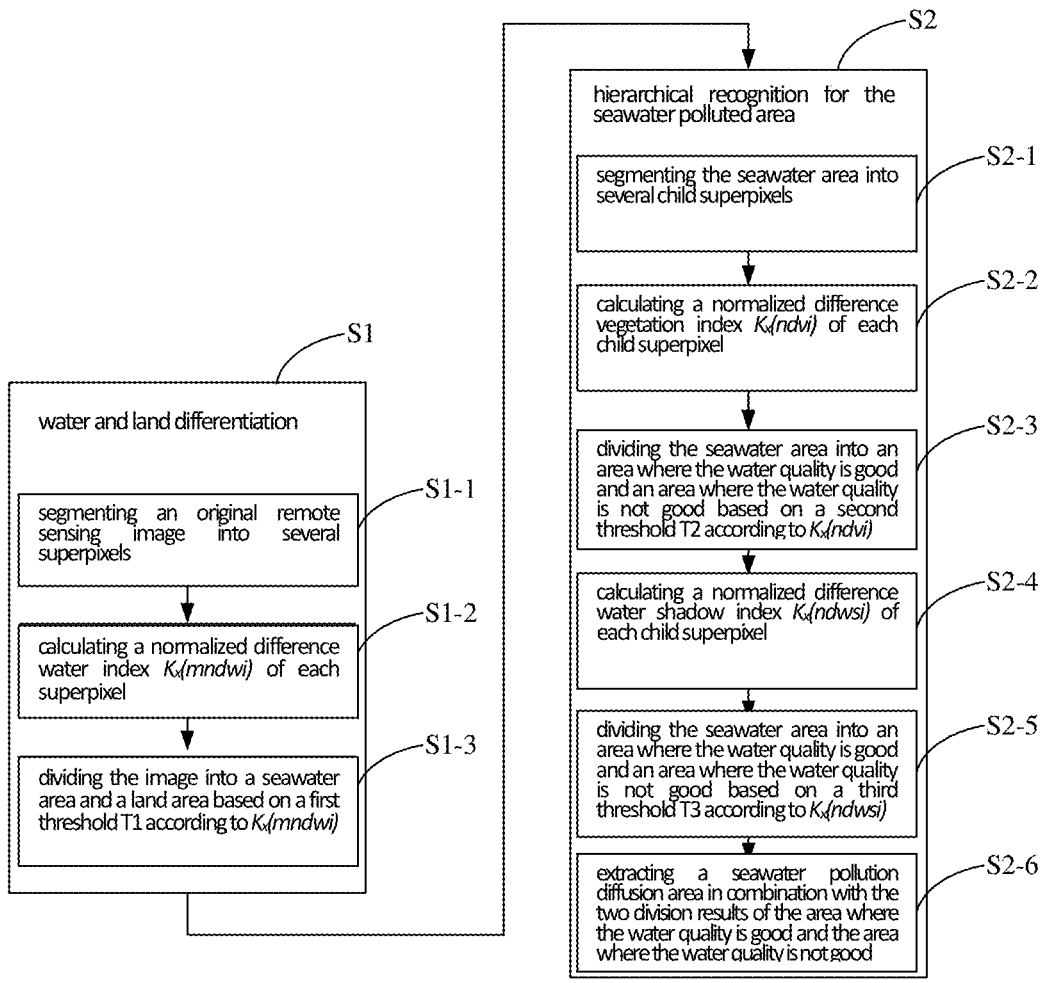
FIG. 1 is a process diagram of a method for recognizing a seawater polluted area based on a high-resolution remote sensing image in accordance with the present invention.

According to the method provided by the present invention, firstly, automatic sea and land classification is performed on a remote sensing image by using a supervised learning algorithm, a classification result may reach a higher precision level by processized iterative clustering, and meanwhile, compared with an existing analysis and classification method for a sea and land boundary, the algorithm is less in calculation; and then, a chlorophyll-associated normalized difference vegetation index (NDVI), a brightness-associated normalized difference water shadow index (NDWSI), a segmentation-based image interpretation thought and a human visual saliency based mechanism in remote sensing interpretation are combined by virtue of a chlorophyll concentration difference of a seawater polluted area and surrounding seawater and a brightness difference of pollutant shadows, and then, the seawater polluted area is extracted by threshold segmentation. Reference is made to FIG. 1, in one embodiment, a method for recognizing a seawater polluted area in the present invention includes the following steps.

Step S1, water and land differentiation is performed.

Figure 2:
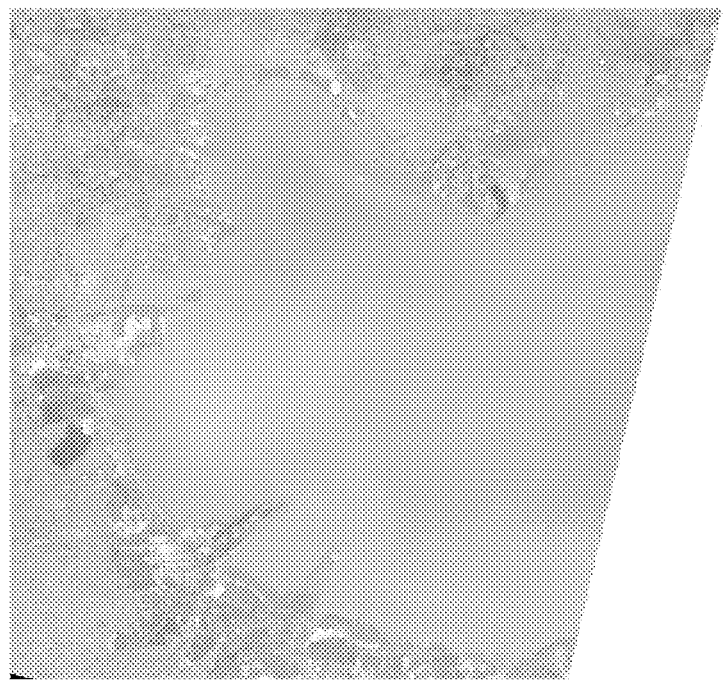
FIG. 2 shows a to-be-treated original high-resolution remote sensing image in accordance with an embodiment of the present invention.

As shown in FIG. 2, the resolution ratio of a processed original high-resolution remote sensing image in an embodiment reaches 30 m, the image is of a size having 7681 rows and 7821 columns and contains five wavebands which are respectively a blue waveband (Blue, 0.45-0.52 μm), a green waveband (Green, 0.52-0.59 μm), a red waveband (Red, 0.63-0.69 μm), a middle and far infrared waveband (Mir, 0.77-0.89 µm) and a near infrared waveband (Nir, 1.55-1.75 µm). An objective is to recognize a seawater polluted area from the image.

The water and land differentiation specifically includes the following steps.

Step S1-1, a remote sensing image is segmented. In the present embodiment, a linear iterative clustering method is used to convert the remote sensing image into a five-dimensional feature vector in a CIELAB color space and XY coordinates, then, a distance measurement standard is established for the five-dimensional feature vector, and local iterative clustering is performed on pixels of the image. By using this method, superpixels which are compact and approximately uniform can be generated, and the method has higher comprehensive effects in the aspects of calculation speed, marine pollutant distribution profile maintenance and segmented superpixel shape. In the embodiment, the number of to-be-segmented superpixels is set to be 800.

Specific steps for implementing image segmentation by using linear iterative clustering are described as follows.

(1) Cluster centers are initialized: cluster centers are uniformly distributed in the image according to the set number of the superpixels, and an initial cluster center is a certain pixel point in a superpixel cluster. In the present embodiment, there are 60/073,101 pixel points in total in the remote sensing image, the image is pre-segmented into K superpixels with the same size, the size of each superpixel cluster is 60073101/K, and a distance (step length) between adjacent superpixel cluster centers is approximate to S=sqrt(60073101/K). In the present embodiment, the value of K is 800, and the step length between the adjacent superpixel cluster centers is expressed as S=274.

(2) A cluster center is reelected within a neighborhood of a 3*3 pixel range of the cluster centers. Gradient values of all pixel points of the remote sensing image in the neighborhood are calculated, and the cluster center is moved to a place where the gradient is minimum in the neighborhood. Therefore, the phenomenon that the cluster center falls on a profile boundary where the gradient is greater to affect a subsequent clustering effect is avoided. It should be understood that the neighbourhood range is not limited to 3*3 pixels, but only plays an exemplary role herein.

Figure 3:
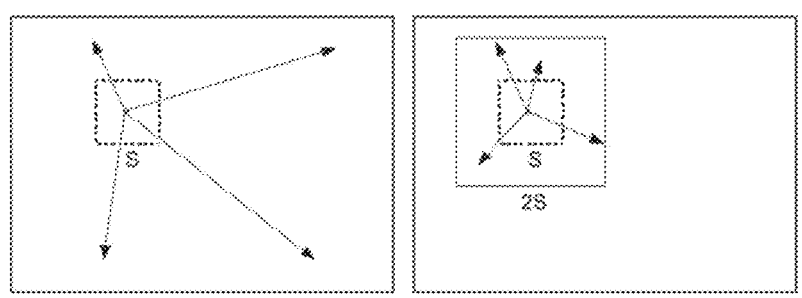
FIG. 3 is a schematic search diagram of a linear iterative clustering method in accordance with an embodiment of the present invention.

(3) Category labels (showing the cluster centers to which all the pixel points belong) are distributed for each pixel point in the neighborhood of all the cluster centers. Different from a k-means method by which search is performed in the overall image, the search range of the linear iterative clustering is 2S*2S, and therefore, algorithm convergence can be accelerated, as shown in FIG. 3. Herein, the desired size of the superpixel is S*S, but the search range is 2S*2S, so that the clustering accuracy is improved, and error distribution is avoided (in the present embodiment, S=274).

(4) A color distance and a spatial distance are measured.

In the present step, a Lab color mode is adopted to measure the color distance and the spatial distance. The Lab mode depends on neither rays nor pigments, it is a color mode determined by the International Commission on Illumination (CIE) and theoretically including all colors which are visible to human eyesight. The Lab mode consists of three channels. One of the channels is transparent, that is, L. The other two channels are color channels denoted by A and B. Colors included by the channel A range from dark green (low brightness value) to gray (medium brightness value) to bright pink (high brightness value); and colors of the channel B range from dark blue (low brightness value) to gray (medium brightness value) to yellow (high brightness value).

A distance from each searched pixel point to the cluster center is respectively calculated. The distance is calculated by using a method shown as follows:

$$d_c = \sqrt{(l_j-l_i)^2+(a_j-a_i)^2+(b_j-b_i)^2}$$

$$d_s = \sqrt{(x_j-x_i)^2+(x_j-y_i)^2}$$

$$D' = \sqrt{(d_c/N_c)^2+(d_s/N_s)^2}$$

Wherein $d_c$ represents the color distance, l represents the brightness (0 to 100) of each pixel point, a represents a coordinate value (+127 to −128) of each pixel point on the channel A, b represents a coordinate value (+127 to −128) of each pixel point on the channel B, i represents the cluster center, j represents any one pixel point in the cluster center, $d_s$ represents the spatial distance, x represents a horizontal coordinate of each pixel point converted from the remote sensing image under XY coordinates, y represents a vertical coordinate of each pixel point converted from the remote sensing image under XY coordinates, $N_s$ represents the maximum intra-cluster spatial distance and is defined as $N_s$=S=sqrt(N/K), N represents the number of the pixel points, and they are applicable to each cluster. The maximum color distance $N_c$ differs along with a different remote sensing image and a different cluster, and in the present embodiment, the fixed constant m=10 (the value range [1, 40], and the value is generally 10) is used as the maximum color distance. A finally measured distance D' is expressed as follows:

$$D' = \sqrt{(d_c/m)^2+(d_s/S)^2}$$

each pixel point may be searched by a plurality of cluster centers, and therefore, each pixel point may be away from a surrounding cluster center for a distance, and the cluster center corresponding to the minimum value is used as the cluster center of the pixel point.

(5) Iteration optimization is performed: the above-mentioned steps (2) to (4) are continuously iterated until error convergence is achieved, that is, the original superpixel obtained in the step 4 is used as a subsequent initial cluster center, then, operations in the steps (2) to (4) are performed until the cluster center of each pixel point is not changed to obtain an iterated superpixel. Found by an experiment for the remote sensing image, a relatively ideal effect may be achieved by performing iteration for ten times, and in the present embodiment, the number of iterations is 10. A clustering process is a process of searching approximately similar terms, pixels similar to the cluster center within a radiation range of the cluster center fall within the cluster center, information included after the cluster center as well as spectral information, texture information and the like of the pixels falling within the cluster center pixel are combined exceeds information included by single pixel so as to be called as superpixels. The superpixels are obtained after the cluster center is continuously subjected to iterative optimization to be approximately stabilized, and the superpixels include cluster centers and pixel points.

(6) An iteration result is optimized: discontinuous superpixels and undersized superpixels are redistributed to neighboring superpixels according to a "Z"-shaped trend (from left to right and from top to bottom), and traversed pixel points are distributed to the corresponding labels until all the points are traversed, which aim at optimizing iteration defects in the step 5: multi-connection, undersized superpixels, a situation that a single superpixel is segmented into a plurality of discontinuous superpixels and the like. Finally, the remote sensing image is segmented into a polymer formed by combining several superpixels.

Step S1-2, a normalized difference water index Kr(mndwi) of each cluster set x is calculated by using a normalized difference water index mndwi according to a calculation formula expressed as follows:

$$K_x(mndwi) = \frac{\sum_{k_i \in (x)} P_{x_i}(\text{Green}) - \sum_{k_i \in n(x)} P_{x_i}(Mir)}{\sum_{k_i \in n(x)} \left(P_{x_i}(\text{Green}) - P_{x_i}(Mir)\right)}$$

wherein x represents a currently calculated cluster set, one cluster set represents a superpixel, i represents one pixel point in the currently calculated superpixel x, n(x) represents a set of all the pixel points in the currently calculated superpixel x, $P_{xi}$(Green) represents a green waveband value of the one pixel point i in the currently calculated superpixel x, $P_{xi}$(Mir) represents an Mir waveband value of the one pixel point i in the currently calculated superpixel x, $K_x$(mndwi) represents a normalized difference water index value of the currently calculated superpixel x, $-1 \leq K_x$(mndwi)$=1$, wherein a negative value represents a ground cover which is a city, a road and the like and capable of highly reflecting visible light; 0 represents rock or naked soil and the like, and Green is approximately equal to Mir; and a positive value represents a marine area and is increased with the increment of seawater depth and transparency.

Step S1-3, a seawater area boundary is determined by using a maximum between-cluster variance method determined by using an adaptive threshold.

The cluster set is divided into two parts including a foreground and a background according to a gray characteristic of $K_x$(mndwi) of the cluster set obtained in the step S1-2. If a segmentation threshold, which is called as a first threshold, of the foreground and the background is marked as T1, a ratio of the number of pixel points of the foreground in the image is marked as $w_0$, and an average gray of the foreground is marked as $u_0$; and a ratio of the number of pixel points of the background in the image is remarked as $w_1$, an average gray of the background is marked as $u_1$, the total average gray of the image is marked as u, and variances of images of the foreground and the background are respectively marked as $g_0$ and $g_1$, $$g_0 = w_0 \times w_1 \times (u_0 - u_1))^2$$
$$g_1 = \frac{w_0}{1 - w_0} \times (u_0 - u)^2$$

Figure 4:
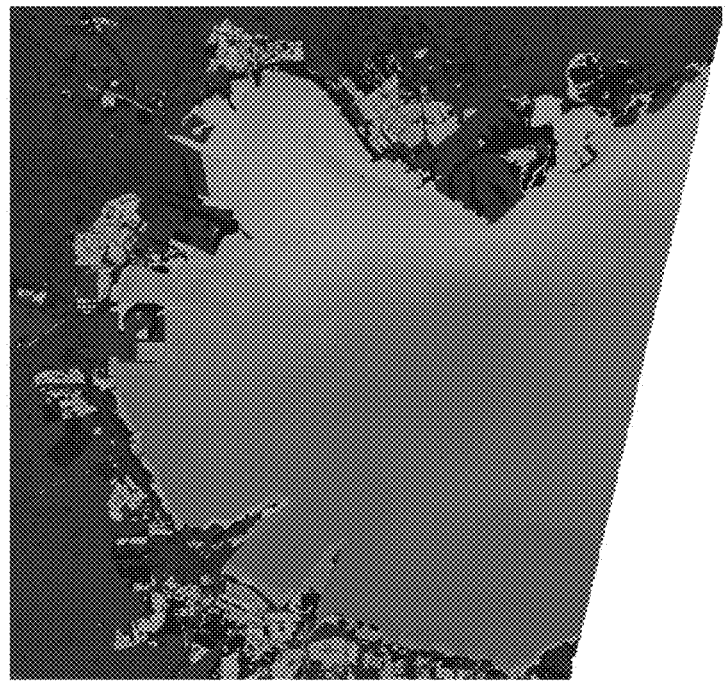
FIG. 4 shows an illustration of a first threshold on an image in accordance with an embodiment of the present invention.
Figure 5:
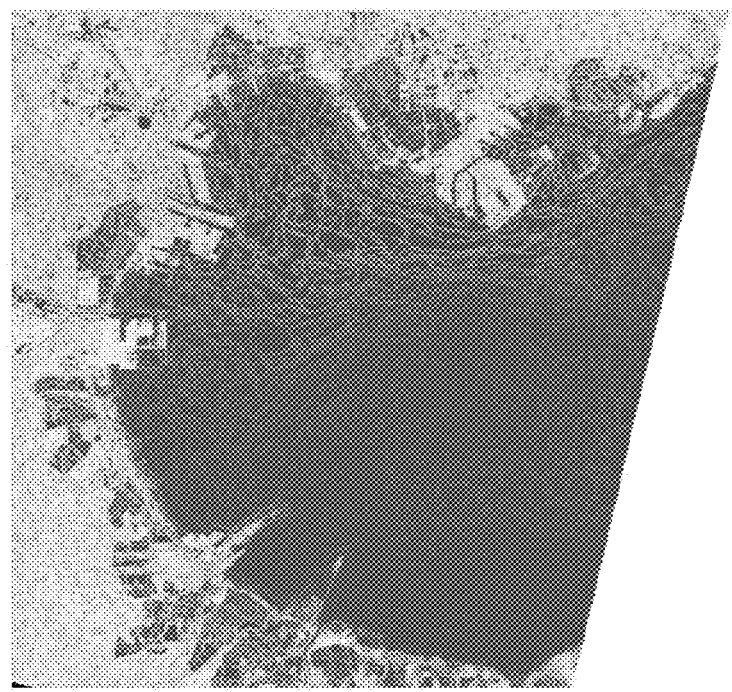
FIG. 5 is a recognition result of a marine area based on a first threshold T1 in accordance with an embodiment of the present invention.

When a difference value of the variances $g_0$ and $g_1$ is maximized, a difference of the foreground and the background may be regarded to be maximized, and at the moment, the gray T is the optimal threshold. When the optimal threshold is used, the difference of the two parts should be maximized, and a difference measurement standard adopted in the maximum between-cluster variance method is exactly a common maximum between-cluster variance method. If a between-cluster variance between the foreground and the background is greater, the difference between the two parts of the image is proven to be greater; when parts of objects are distributed to backgrounds by mistake or parts of the backgrounds are distributed to the objects by mistake, the difference of the two parts may be reduced; and when the between-cluster variance is greatest, the probability of error distribution is proven to be lowest. A sea and land boundary is obtained by using the first threshold T1 corresponding to the maximum between-cluster variance. The cluster sets of which the normalized difference water indices $K_x$(mndwi) are greater than the first threshold T1 are set to be in a marine area, and other cluster sets are set to be in a non-marine area. In the embodiment, by calculation, $K_x$(mndwi)$=T1=-0.1012$, and an illustration of the first threshold obtained by calculation on the image is shown as FIG. 4. A recognition result of the marine area based on the first threshold T1 is shown as FIG. 5.

Step S1-4, precision is detected: the precision is checked and adjusted based on a human visual display mechanism.

Preferably, a water and land area boundary obtained by using a maximum between-cluster variance method based on a human visual recognition mechanism in combination with a water and land area boundary of a panchromatic remote sensing image.

Step S2, a seawater polluted area is hierarchically recognized.

After the marine area is obtained, the seawater polluted area is further extracted by virtue of a chlorophyll concentration difference of a seawater polluted area and surrounding seawater and a brightness difference of pollutant shadows. The step includes the following steps.

Step S2-1, the seawater area obtained in the step S1 is re-segmented. Finer child superpixels are obtained on the basis of the superpixels obtained in the step S1. In the present embodiment, a linear iterative clustering method is used to convert a remote sensing image of a marine area into a five-dimensional feature vector in a CIELAB color space and XY coordinates on the basis of the marine area obtained in the step S1, and local iterative clustering is performed on pixels of the image. Different from the step S1, the iterative clustering in this step is performed in the superpixels obtained in the step S1. By using this method, child superpixels which are compact and approximately uniform can be generated, and the method has higher comprehensive effects in the aspects of calculation speed, marine pollutant distribution profile maintenance and segmented child superpixel shape.

(1) Cluster centers are initialized: cluster centers are redistributed by taking a range of all the superpixels in the seawater area obtained in the step S1 as a boundary according to a set number of the child superpixels, and a child initial cluster center is a certain pixel point in a certain superpixel cluster. In the present embodiment, there are 25175484 pixel points in total in the remote sensing image of the marine area, the image is pre-segmented into K' child superpixels with the same size, the size of each child superpixel cluster is 25175484/K', and a distance (step length) between adjacent child superpixel cluster centers is approximate to S'=sqrt (25175484/K'). In the present embodiment, the value of K' is 3000, and the step length between the adjacent child superpixel cluster centers is expressed as S'=92. Therefore, textures, details and contexts of the superpixels obtained in the step S1 are inherited in the present step, so that a superpixel layer obtained in the step S1 is called as a parent layer, this layer is called as a child layer, and the obtained superpixels are child superpixels of parent superpixels obtained in the step S1.

(2) A cluster center is reelected within a neighborhood of a 3*3 pixel range of the child cluster centers. Gradient values of all pixel points of the remote sensing image in the neighborhood are calculated, and the cluster center is moved to a place where the gradient is minimum in the neighborhood. Therefore, the phenomenon that the cluster center falls on a profile boundary where the gradient is greater to affect a subsequent clustering effect is avoided.

(3) Category labels (showing the cluster centers to which all the pixel points belong) are distributed for each pixel point in the neighborhood of all the child cluster centers. Different from a k-means method by which search is performed in the overall image, the search range of the linear iterative clustering is 2S'*2S', and therefore, algorithm convergence can be accelerated. Herein, the desired size of the child superpixel is S'*S' (in the present embodiment, S'=92), but the search range is 2S'*2S', so that the clustering accuracy is improved, and error distribution is avoided.

(4) A color distance and a spatial distance are measured. The step is the same as the calculation method in the step S1-1, a linear iterative clustering method is further used to convert the image of the seawater area into a five-dimensional feature vector in a CIELAB color space and XY coordinates, then, a distance measurement standard is established for the five-dimensional feature vector, and local iterative clustering is performed on pixels of the image. In the present embodiment, the fixed constant m=10 (the value range [1, 40], and the value is generally 10) is used as the maximum color distance.

(5) Iteration optimization is performed: the above-mentioned steps (2) to (4) are continuously iterated until error convergence is achieved, that is, the child cluster center of each pixel point is not changed to obtain an iterated child superpixel. Found by an experiment for the remote sensing image, a relatively ideal effect may be achieved by performing iteration for ten times, and in the present embodiment, the number of iterations is 10.

(6) An iteration result is optimized: discontinuous child superpixels and undersized child superpixels are redistributed to neighboring child superpixels according to a "Z"-shaped trend (from left to right and from top to bottom), the child superpixels located on a parent superpixel boundary are optimized to parent superpixels of the child superpixels, and thus, the phenomenon that the same child superpixel belongs to a plurality of parent superpixels is avoided. Traversed pixel points are distributed to the corresponding labels until all the points are traversed. In this way, iteration defects in the step 5: multi-connection, undersized child superpixels, a situation that a single superpixel is segmented into a plurality of discontinuous child superpixels and the child superpixels are not clearly affiliated and the like can be optimized. Finally, finer child superpixels are obtained on the basis of the parent superpixels obtained in the step S1. Step S2-2, a normalized difference vegetation index $K_x(ndvi)$ of each child superpixel x is calculated by using a normalized difference vegetation index ndvi on the basis of the obtained child superpixels, and the calculation formula is expressed as follows:

$$K_x(ndvi) = \frac{\sum_{k_i \in x(n)} P_{x_i}(\text{Red}) - \sum_{k_i \in n(x)} P_{x_i}(Nir)}{\sum_{k_i \in n(x)} (P_{x_i}(\text{Red}) - P_{x_i}(Nir))}$$

wherein x represents a currently calculated child superpixel, i represents one pixel point in the currently calculated child superpixel x, n represents a set of all the pixel points in the currently calculated child superpixel x, $P_{x_i}(\text{Red})$ represents a red waveband value of the one pixel point i in the currently calculated child superpixel x, $P_{x_i}(Nir)$ represents a near infrared Nir waveband value of the one pixel point i in the currently calculated child superpixel x, and $K_x(ndvi)$ represents a normalized difference vegetation index value of the currently calculated child superpixel x.

Figure 6:
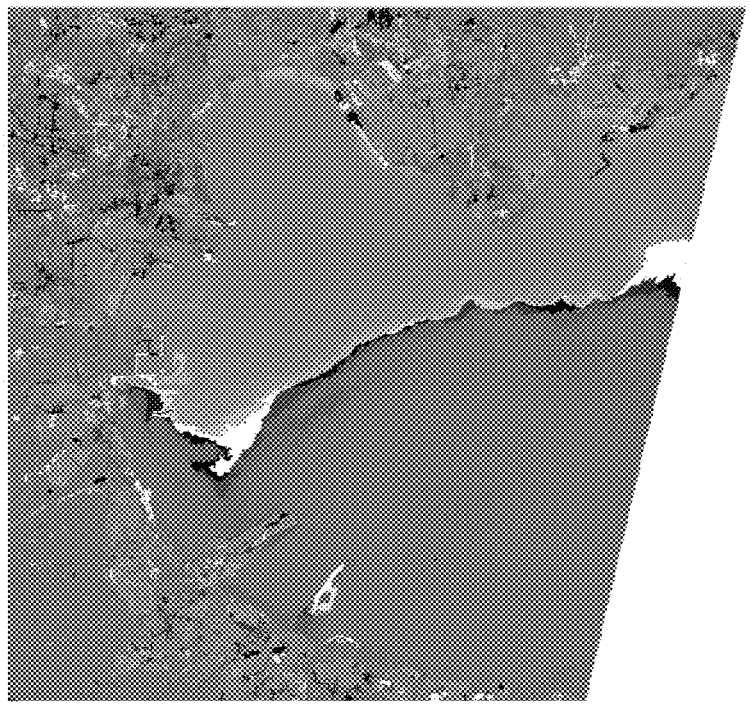
FIG. 6 shows an illustration of a second threshold on an image in accordance with an embodiment of the present invention.
Figure 7:
FIG. 7 shows recognition results of areas where the water qualities are different based on a second threshold T2 in accordance with an embodiment of the present invention.

Step S2-3, according to the normalized difference vegetation index $K_x(ndvi)$ of each child superpixel in the seawater area in the step S2-2, the child superpixels of which the normalized difference vegetation indices are smaller than a second threshold T2 are set to be in an area where the water quality is good, and other child superpixels are set to be in an area where the water quality is not good. The criterion for setting the second threshold T2 is that the area where the water quality is good and the area where the water quality is not good may be differentiated in the image. The cluster set is divided into two parts including a foreground and a background in combination with a gray characteristic of $K_x(ndvi)$ of the cluster set obtained in the step S2-2. A second threshold expressed as T2=0.1021 for differentiation is obtained by using the maximum between-cluster variance method determined according to the adaptive threshold used in the step S1-3, and the second threshold obtained by calculation is illustrated as FIG. 6. The child superpixels of which the normalized difference vegetation indices are smaller than 0.1021 are set to be in an area where the water quality is good, and the child superpixels of which the normalized difference vegetation indices are greater than 0.1021 are set to be in an area where the water quality is not good, and the area where the water quality is good is extracted, as shown in FIG. 7.

Figure 8:
FIG. 8 is a schematic diagram of a normalized difference water shadow index of a child superpixel in a seawater area in accordance with an embodiment of the present invention.

Step S2-4, a normalized difference water shadow index $K_x(ndwsi)$ of each child superpixel in the seawater area is calculated according to an image segmentation result of the seawater area in the water and land segmentation step in the step 2, and the calculation formula is expressed as follows:

$$K_x(ndwsi) = \frac{\sum_{k_i \in x(n)} P_{x_i}(\text{Green}) - \sum_{k_i \in x(n)} P_{x_i}(Nir2)}{\sum_{k_i \in x(n)} (P_{x_i}(\text{Green}) - P_{x_i}(Nir2))}$$

wherein x represents a currently calculated child superpixel, i represents one pixel point in the currently calculated child superpixel x, n represents a set of all the pixel points in the currently calculated child superpixel x, $P_{x_i}(\text{Green})$ represents a green waveband value of the one pixel point i in the currently calculated child superpixel x, $P_{x_i}(Nir2)$ represents a near infrared Nir2 waveband value of the one pixel point i in the currently calculated child superpixel x, and a result is shown as FIG. 8.

Figure 9:
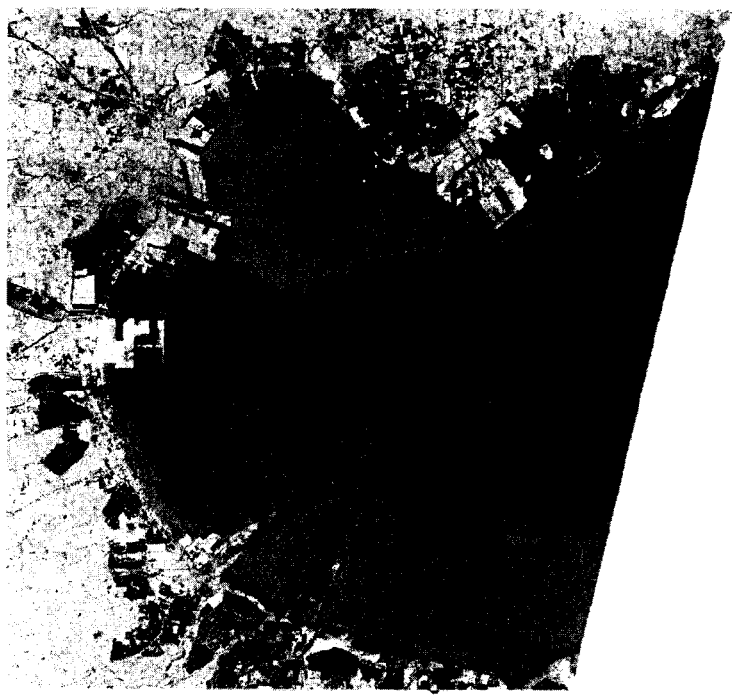
FIG. 9 shows an illustration of a third threshold on an image in accordance with an embodiment of the present invention.
Figure 10:
FIG. 10 shows recognition results of areas where the water qualities are different based on a third threshold T3 in accordance with an embodiment of the present invention.

Step S2-5, a heavily polluted marine area is extracted according to the normalized difference water shadow index ndwsi of each superpixel in the seawater area in the step S2-4, a segmented area where the normalized difference water shadow index is greater than a third threshold T3 is set as an area where the water quality of seawater is not good, and other child superpixels are set to be in an area where the water quality is good. The criterion for setting the third threshold T3 is that an area where heavy metals and silt exist in water and an area where the content of organic substances is overhigh may be differentiated in the current image. The cluster set is divided into two parts including a foreground and a background in combination with a gray characteristic of $K_x(ndwsi)$ of the cluster set obtained in the step S2-4. A third threshold expressed as T3=1.831 for differentiation is obtained by using the maximum between-cluster variance method determined according to the adaptive threshold used in the step S1-3. The threshold obtained by calculation is illustrated as FIG. 9. The superpixels of which the normalized difference water shadow indices are greater than 1.831 are set to be in an area where the water quality is not good, and the superpixels of which the normalized difference water shadow indices are smaller than 1.831 are set to be in an area where the water quality is good, and the area where the water quality is not good is extracted, as shown in FIG. 10.

Step S2-6, a seawater pollution diffusion area (protection area) is extracted in combination with the area, extracted in the step S2-3, where the water quality of the seawater is good and the area, extracted in the step S2-5, where the water quality of the seawater is not good.

The area of the seawater is large, in order to further improve the extraction precision of a seawater pollution boundary and provide a clearer and more definite range for the prevention and control of seawater pollution diffusion to reduce the manpower and material costs and increase the pollution prevention and control efficiency, the superpixels of the seawater area meeting $K_x(ndwsi) \leq T3$ and $K_x(ndvi) \geq T2$ obtained in the above-mentioned steps, namely the range of a transition area between a seawater polluted area and a non-polluted area, needs to be further narrowed to obtain a range of seawater pollution diffusion forefronts.

Figure 11:
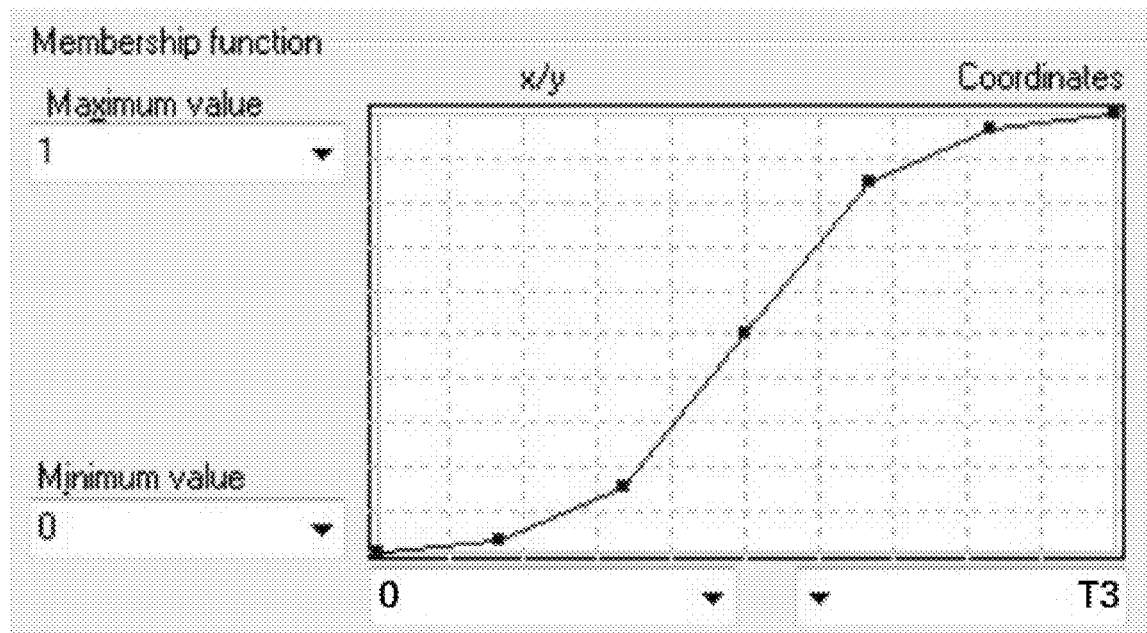
FIG. 11 is a schematic diagram of a fuzzy algorithm for membership function classification in an area meeting $K_x$(ndwsi)≤T3 in accordance with an embodiment of the present invention.
Figure 12:
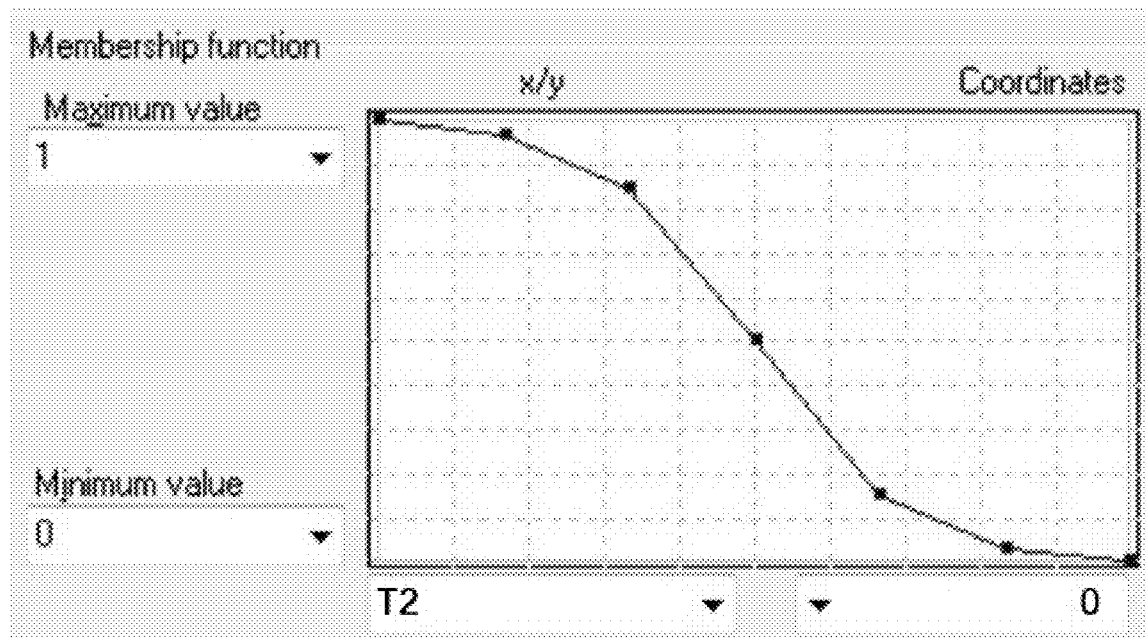
FIG. 12 is a schematic diagram of a fuzzy algorithm for membership function classification in an area meeting $K_x$(ndvi)≥T2 in accordance with an embodiment of the present invention.
Figure 13:
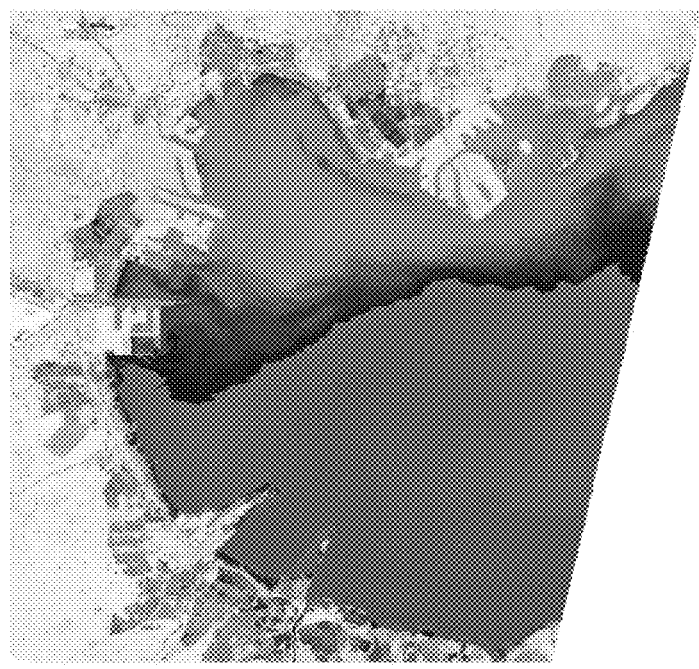
FIG. 13 is a schematic diagram of a seawater pollution diffusion area (protection area) obtained in accordance with an embodiment of the present invention.

According to the present invention, the range of the transition area between the seawater polluted area and the non-polluted area is further narrowed by membership function classification which is described and specifically implemented by the following steps: if there is a figure $Ax \in [0, 1]$ corresponding to any one element x in a domain (research scope), A is called as a fuzzy set in U, and Ax is called as a membership of x to A. When x is changed in U, Ax is a function and is called as a membership function of A. If the membership Ax is closer to 1, it is proven that the membership of x to A is higher, and if the membership Ax is closer to 0, it is proven that the membership of x to A is lower. A membership function Ax of which the value falls within the range [0, 1] is used to represent the membership of x to A. In the present invention, the research scope covers the seawater polluted area and the seawater pollution diffusion area in the area where the water quality of the seawater is good, if the seawater area meeting $K_x(ndwsi) \leq T3$ and $K_x(ndvi) \geq T2$ is set as a research scope U, each child superpixel x is any one element in U; and by virtue of a membership function, an area where the child superpixel meeting $K_x(ndwsi)=T3$ is set to have the membership Ax(max)=1 belongs to a polluted area; an area where the child superpixel meeting $K_x(ndvi)=T2$ is set to have the membership Ax(min)=0 belongs to an area where the water quality is good. A fuzzy set $Ax \in [0, 1]$ corresponding to the research scope U (the seawater area meeting $K_x(ndwsi) \leq T3$ and $K_x(ndvi) \geq T2$) is created, fuzzy classification is performed on the superpixels meeting $K_x(ndwsi) \leq T3$ in the research scope U by using a fuzzy algorithm (FIG. 11) for the membership function, the child superpixels in a pollution and non-pollution staggered area outside a boundary meeting $K_x(ndwsi) \leq T3$ are screened, and then, a threshold T4 of a boundary of the polluted area and the non-polluted area is further obtained. Fuzzy classification is performed on the superpixels meeting $K_x(ndvi) \leq T2$ in the research scope U by using a fuzzy algorithm (FIG. 12) for the membership function, the child superpixels in a pollution and non-pollution staggered area outside a boundary meeting $K_x(ndvi) \geq T2$ are screened, and then, a threshold T5 of a boundary of the polluted area and the non-polluted area is further obtained. The areas meeting $K_x(ndvi) \geq T5$ and $K_x(ndwsi) \leq T4$ are combined to obtain U1 (a seawater area meeting $K_x(ndwsi) \leq T4$ and $K_x(ndvi) \geq T5$), namely a seawater pollution diffusion frontline (protection area). As shown in FIG. 13, based on a technical concept the same as those in the embodiments of the method, another embodiment of the present invention provides a computer device. The device includes one or more processors; a memory; and one or more programs, wherein the one or more programs are stored in the memory and are configured to be executed by the one or more processors, and all the steps in the embodiments of the method are implemented when the programs are executed by the processors.

It should be understood by the skilled in the art that the embodiments of the present invention may provide a method, system or computer program product. Therefore, forms of a complete hardware embodiment, a complete software embodiment or a software and hardware aspect combined embodiment may be adopted in the present invention. Moreover, a form of a computer program product executed on one or more computer available storage media (including, but not limited to a magnetic disk memory, a CD-ROM and an optical memory) including computer available program codes may be adopted in the present invention.

The present invention is described by referring to process diagrams and/or block diagrams of the method, device (system) and computer program product according to the embodiments of the present invention. It should be understood that each process and/or block in the process diagrams and/or block diagrams as well as a combination of processes and/or blocks in the process diagrams and/or block diagrams may be implemented by computer program instructions. The computer program instructions may be provided to a general-purpose computer, a special-purpose computer, an embedded processor or processors of other programmable data processing devices to generate a machine, so that an apparatus for achieving specified functions in one or more processes in the process programs and/or one or more blocks in the block diagrams is generated through the instructions executed by the computer or the processors of other programmable data processing devices.

These computer program instructions may also be stored in a computer readable memory capable of guiding the computer or other programmable data processing devices to work in a specific manner, so that the instructions stored in the computer readable memory generate a product including an instruction apparatus, and the instruction apparatus achieves the functions specified in the one or more processes in the process diagrams and/or one or more blocks in the block diagrams.

These computer program instructions may also be loaded in the computer or other programmable data processing devices, so that a series of operation steps are performed on the computer or other programmable data processing devices to generate processing achieved by the computer, and furthermore, the instructions executed on the computer or other programmable data processing devices provide steps for achieving the specified functions in the one or more processes in the process diagrams and/or one or more blocks in the block diagrams.

Finally, it should be noted that the above-mentioned embodiments are merely used to illustrate the technical solutions of the present invention, but not to limit them. Although the present invention has been described in detail by reference to the aforementioned embodiments, it should be understood by a person of ordinary skill in the art that it is still possible to modify or equivalently substitute specific implementations of the present invention, and any modifications or equivalent substitutions without departing from the spirit and scope of the present invention shall.

The invention claimed is:

1. A method for recognizing a seawater polluted area based on a high-resolution remote sensing image, the method:
   differentiating water and land, including:
      segmenting an original remote sensing image into several superpixels by using a linear iterative clustering method;
      calculating a normalized difference water index Kx(mndwi) of each superpixel; and
      dividing the image into a seawater area and a land area based on a first threshold T1 according to Kx(mndwi); and
   hierarchically recognizing a seawater polluted area, including:
      segmenting the seawater area into several child superpixels with reference to a superpixel segmentation method;
      calculating a normalized difference vegetation index Kx(ndvi) of each child superpixel;
      dividing the seawater area into an area where the water quality is good and an area where the water quality is not good based on a second threshold T2 according to Kx(ndvi);
      calculating a normalized difference water shadow index Kx(ndwsi) of each child superpixel;
      dividing the seawater area into an area where the water quality is good and an area where the water quality is not good based on a third threshold T3 according to Kx(ndwsi); and
      extracting a seawater pollution diffusion area in combination with the area, extracted according to the second threshold T2, where the water quality of seawater is good and the area, extracted according to the third threshold T3, where the water quality of seawater is not good.

2. The method for recognizing the seawater polluted area according to claim 1, wherein segmenting the original remote sensing image into the several superpixels comprises the following steps:
   (1) uniformly distributing cluster centers in the image according to a set number of the superpixels, wherein an initial cluster center is a certain pixel point in a superpixel cluster;
   (2) reelecting a cluster center within a neighborhood of a specified pixel range of the cluster centers, calculating gradient values of all pixel points of the remote sensing image in the neighborhood, and moving the cluster center to a place where the gradient is minimum in the neighborhood;
   (3) distributing category labels showing the cluster centers to which all the pixel points belong in the neighborhood of all the cluster centers;
   (4) measuring a color distance and a spatial distance by adopting a Lab color mode, and respectively calculating a distance from each searched pixel point to the cluster center, wherein the distance is calculated by using a method shown as follows:

$$d_c = \sqrt{(i_j - l_i)^2 + (a_j - a_i)^2 + (b_j - b_i)^2}$$

$$d_s = \sqrt{(x_j - x_i)^2 + (x_j - y_i)^2}$$

$$D' = \sqrt{(d_c/N_c)^2 + (d_s/N_s)^2}$$

wherein dc represents the color distance, l represents the brightness of each pixel point, a represents a coordinate value of each pixel point on a channel A, b represents a coordinate value of each pixel point on a channel B, i represents the cluster center, j represents any one pixel point in the cluster center, ds represents the spatial distance, x represents a horizontal coordinate of each pixel point converted from the remote sensing image under XY coordinates, y represents a vertical coordinate of each pixel point converted from the remote sensing image under XY coordinates, Ns represents the maximum intra-cluster spatial distance and is defined as Ns=S=sqrt(N/K), N represents the number of the pixel points, K represents the number of the superpixels, Nc represents the maximum color distance, and D' represents a finally measured distance; and for each pixel point, the cluster center corresponding to the minimum value of the finally measured distance is used as the cluster center of the pixel point;
   (5) repeating the steps (2) to (4) until the cluster center of each pixel point is not changed to obtain an iterated superpixel; and
   (6) redistributing discontinuous superpixels and undersized superpixels to neighboring superpixels according to a "Z"-shaped trend, and distributing traversed pixel points to the corresponding labels until all the pixel points are traversed.

3. The method for recognizing the seawater polluted area according to claim 1, wherein a formula for calculating the normalized difference water index Kx(mndwi) of each superpixel is expressed as follows:

$$K_x(mndwi) = \frac{\sum_{k_i \in x(n)} P_{x_i}(\text{Green}) - \sum_{k_i \in x(n)} P_{x_i}(Mir)}{\sum_{k_i \in x(n)} \left(P_{x_i}(\text{Green}) + P_{x_i}(Mir)\right)}$$

wherein x represents a currently calculated superpixel, i represents one pixel point in the currently calculated superpixel x, n(x) represents a set of all the pixel points in the currently calculated superpixel x, Pxi(Green) represents a green waveband value of the one pixel point i in the currently calculated superpixel x, Pxi(Mir) represents an Mir waveband value of the one pixel point i in the currently calculated superpixel x, Kx(mndwi) represents a normalized difference water index value of the currently calculated superpixel x, $-1 <= Kx(mndwi) = 1$, wherein a positive value represents a marine area, or else, a non-positive value represents a land area.

4. The method for recognizing the seawater polluted area according to claim 1, further comprising, after dividing the image into the seawater area and the land area:

checking and adjusting a water and land area boundary obtained by using a maximum between-cluster variance method based on a human visual recognition mechanism in combination with a water and land area boundary of a panchromatic remote sensing image.

5. The method for recognizing the seawater polluted area according to claim 1, wherein the first threshold T1, the second threshold T2 and the third threshold T3 are determined by using the maximum between-cluster variance method.

6. The method for recognizing the seawater polluted area according to claim 1, wherein a formula for calculating the normalized difference vegetation index Kx(ndvi) of each child superpixel is expressed as follows:

$$K_x(\text{ndvi}) = \Sigma_{x_j \in n(x)} P_{x_j}(\text{Red}) - \Sigma_{x_j \in n(x)} P_{x_j}(\text{Nir}) / \Sigma_{x_j \in n(x)} (P_{x_j}(\text{Red}) + P_{x_j}(\text{Nir}))$$

wherein x represents a currently calculated child superpixel, i represents one pixel point in the currently calculated child superpixel x, n represents a set of all the pixel points in the currently calculated child superpixel x, Pxi(Red) represents a red waveband value of the one pixel point i in the currently calculated child superpixel x, Pxi(Nir) represents a near infrared Nir waveband value of the one pixel point i in the currently calculated child superpixel x, and Kx(ndvi) represents a normalized difference vegetation index value of the currently calculated child superpixel x.

7. The method for recognizing the seawater polluted area according to claim 1, wherein a formula for calculating the normalized difference water shadow index Kx(ndwsi) of each child superpixel is expressed as follows:

wherein x represents a currently calculated child superpixel, i represents one pixel point in the currently calculated child superpixel x, n represents a set of all the pixel points in the currently calculated child superpixel x, Pxi(Green) represents a green waveband value of the one pixel point i in the currently calculated child superpixel x, and Pxi(Nir2) represents a near infrared Nir2 waveband value of the one pixel point i in the currently calculated child superpixel x.

8. The method for recognizing the seawater polluted area according to claim 1, wherein extracting the seawater pollution diffusion area in combination with the area extracted according to the second threshold T2, and the area extracted according to the third threshold T3 is not good is implemented by using membership function classification as follows:
if the seawater area meeting Kx(ndwsi)≤T3 and Kx(ndvi) ≥T2 is set as a research scope U, each child superpixel x is any one element in U;
by virtue of a membership function, an area where the child superpixel meeting Kx(ndvi)=T2 is set to have the membership Ax(min)=0 belongs to an area where the water quality is good; and
an area where the child superpixel meeting Kx(ndwsi)=T3 is set to have the membership Ax(max)=1 belongs to a polluted area.

9. A computer device comprising:
one or more processors;
a memory; and
one or more programs, wherein:
the one or more programs are stored in the memory and are configured to be executed by the one or more processors, and
the method of claim 8 is implemented when the one or more programs are executed by the processors.

10. A computer device comprising:
one or more processors;
a memory; and
one or more programs, wherein:
the one or more programs are stored in the memory and are configured to be executed by the one or more processors, and
the method of claim 1 is implemented when the one or more programs are executed by the processors.

11. A computer device comprising:
one or more processors;
a memory; and
one or more programs, wherein:
the one or more programs are stored in the memory and are configured to be executed by the one or more processors, and
the method of claim 2 is implemented when the one or more programs are executed by the processors.

12. A computer device comprising:
one or more processors;
a memory; and
one or more programs, wherein:
the one or more programs are stored in the memory and are configured to be executed by the one or more processors, and
the method of claim 3 is implemented when the one or more programs are executed by the processors.

13. A computer device comprising:
one or more processors;
a memory; and
one or more programs, wherein:
the one or more programs are stored in the memory and are configured to be executed by the one or more processors, and
the method of claim 4 is implemented when the one or more programs are executed by the processors.

14. A computer device comprising:
one or more processors;
a memory; and
one or more programs, wherein:
the one or more programs are stored in the memory and are configured to be executed by the one or more processors, and
the method of claim 5 is implemented when the one or more programs are executed by the processors.

15. A computer device comprising:
one or more processors;
a memory; and
one or more programs, wherein:
the one or more programs are stored in the memory and are configured to be executed by the one or more processors, and
the method of claim 6 is implemented when the one or more programs are executed by the processors.

16. A computer device comprising:
one or more processors;
a memory; and
one or more programs, wherein:
the one or more programs are stored in the memory and are configured to be executed by the one or more processors, and
the method of claim 7 is implemented when the one or more programs are executed by the processors.

* * * * *